United States Patent [19]

Hedden

[11] 3,997,306

[45] Dec. 14, 1976

[54] GLASS FIBER SIZING COMPOSITION FOR THE REINFORCEMENT OF RESIN MATRICES AND METHOD OF USING SAME

[75] Inventor: Jerry C. Hedden, Shelby, N.C.

[73] Assignee: PPG Industries, Inc., Pittsburgh, Pa.

[22] Filed: Mar. 31, 1975

[21] Appl. No.: 565,986

[52] U.S. Cl. ............................... 65/3 C; 106/238; 260/29.3; 260/78.41

[51] Int. Cl.² ...................................... C03C 25/02

[58] Field of Search ............... 65/3 C; 260/78.4 EP, 260/29.3, 78.4 E; 106/238

[56] References Cited

UNITED STATES PATENTS

| | | | |
|---|---|---|---|
| 3,437,517 | 4/1969 | Eilerman et al. ................ | 65/3 C X |
| 3,459,585 | 8/1969 | Killmeyer et al. ............... | 65/3 C X |
| 3,684,467 | 8/1972 | Smucker et al. ..................... | 65/3 C |

*Primary Examiner*—Robert L. Lindsay, Jr.
*Attorney, Agent, or Firm*—John E. Curley

[57] ABSTRACT

A glass fiber size is provided which contains a phenolic epoxy resin, the reaction product of the partial ester of a polycarboxylic acid containing one or more unesterified carboxyl groups with a compound containing more than one epoxy group, an amino silane coupling agent, a methacryloxy alkyl trialkoxy silane, and a non-ionic surface active agent. A method of sizing glass fibers and glass fibers sized with the aforementioned composition are also provided.

17 Claims, No Drawings

GLASS FIBER SIZING COMPOSITION FOR THE REINFORCEMENT OF RESIN MATRICES AND METHOD OF USING SAME

BACKGROUND OF THE INVENTION

This invention relates to a glass fiber sizing composition, a method of applying the sizing composition to the fibers during formation and novel glass fibers for incorporation into resin matrices.

Glass fiber strand is composed of a multitude of fine glass filaments which are formed by being drawn at a high rate of speed from molten cones of glass at the tips of small orifices in a bushing such as is shown in U.S. Pat. No. 2,133,238, incorporated herein by reference. During formation, the filaments are coated while moving at a speed on the order of 1,524 to 6,000 meters per minute with a size which contains a binder to give the strand integrity and workability for any standard textile or reinforcement use. The size also contains a lubricant for the filaments to prevent damage to the strand by abrasion of the individual filaments rubbing against each other or against handling equipment during processing.

Glass fibers in the form of continuous and chopped strand, mat and roving, have found utility in the area of reinforcing resin matrices.

Roving is formed by mounting a plurality of glass fiber forming packages on a creel or support and gathering the strands from the separate packages in parallel, to form a rope or roving. This braided rope or roving is wound on a rotating drum to collect the roving. The roving so produced has a plurality of uses. It can be chopped and separated into separate strands to form chopped strand. It can be woven to form woven roving or it can be used by merely unwinding and impregnating the roving with resin for applications such as filament winding and pultrusion. Roving in whatever form utilized imparts substantial strength to resin composites reinforced therewith.

In order to obtain a glass fiber roving which is acceptable for reinforcement, the formation and processing of the roving must present as few problems in production as possible. The glass fiber strand to form the roving must have integrity in order to tolerate the processing necessary in forming the roving and in subsequent unwinding and chopping operations. Along with the processing properties, glass fiber strand must also demonstrate excellent adhesion to the resin matrix to effectively reinforce the plastic article formed therefrom. Therefore, both the chemical and physical properties of the glass fiber strand in the resin matrix are determined primarily by the sizing composition placed on the strand during formation.

In order to effectively reinforce particular resinous matrices, the sizing composition is usually chemicaly tailored to be compatible with the matrix. It is the common practice of manufacturers of glass fibers to have strands sized with different sizing compositions for the reinforcement of different varieties of resin matrices, i.e., polyesters, epoxys, vinyl esters, thermoplastics and the like.

In order to increase production efficiencies, it has been desired by the manufacturer's of glass fibers to provide a sizing composition which is effective in the reinforcement of a plurality of resin matrices. Thus, a single sizing composition would be advantageous in limiting the production costs of the sized strand by obviating the need for a multiplicity of sizing compositions for each individual type of resin to be reinforced.

The instant invention provides a sizing composition for glass fiber strand which is useful in the production of fiber reinforced resin matrices.

The invention also provides a sizing composition which is useful for the reinforcement of epoxy, polyester, and vinyl ester resin matrices.

Further, the invention provides a sized glass fiber strand which is easily processed during formation and also subsequent to formation.

Further advantages of the invention will become apparent with the further description thereof.

DESCRIPTION OF THE INVENTION

The invention involves treating glass fibers during their formation with an aqueous sizing composition comprising a phenolic epoxy resin, the reaction product of a partial ester of a polycarboxylic acid which contains one or more unesterified carboxyl groups with a compound containing more than one epoxy group, a glass fiber lubricant, sufficient emulsifiers or wetting agents to impart a homogeneous mixture, an amino silane coupling agent and a methacryloxyalkyltrialkoxysilane coupling agent.

The phenolic epoxy resins useful in the practice of the invention are typically epoxy resins which are obtained by the reaction of a stoichiometric excess of an epihalohydrin such as epichlorohydrin with a polyhydric phenol such as bis(4-hydroxyphenyl) 2,2 propane, bis (hydroxyphenyl) methane (obtained by the acid condensation of two moles of phenol with one mole of formaldehyde), hydroquinone, resorcinol and the like. Such compounds are characterized by their phenolic backbone and also the presence of terminal epoxy groups. These compounds are further described in U.S. Pat. Nos. 2,324,483; 2,444,333; 2,494,295; 2,500,600; and 2,511,913, the disclosures of which are incorporated herein by reference. By varying the proportions of the epihalohydrin and the phenolic polyhydroxy compound and/or by varying the reaction conditions, compounds of low, intermediate or higher molecular weights may be produced which range from liquids to solids. Typically, the molecular weights range between 300 and 900, and more preferably, between 300 and 400. These epoxy resins are used in an amount from about 1.9 to 3.2 percent by weight based on the total weight of the sizing composition.

These epoxy resins are effective film formers and the epoxy functionality aids in the bonding of the glass fibers to the resin matrix. Also, it is desired that the epoxy resins have such characteristics to be soluble in the resin matrix thereby imparting maximum compatibility between the glass fibers and polyester resin to be reinforced.

The reaction product of the partial ester of a polycarboxylic acid, which contains one or more unesterified carboxyl groups, with a compound containing more than one epoxy group is formed by reactions known to those skilled in the art. Such reaction products are taught in U.S. Pat. No. 3,437,517. A preferred class of compounds which contain more than one epoxy group per molecule comprises diepoxy compounds containing at least one fused ring epoxy group, i.e., one of the epoxy groups being attached to adjacent carbon atoms which are located in a carbocyclic structure, such epoxys being disclosed also in U.S. Pat. No. 3,437,517, incorporated herein by reference. Polycarboxylic acids which may be used in preparing a polycarboxylic partial ester which contains at least one unesterified carboxyl group include for example, oxalic, malonic, succinic, glutaric, adipic, suberic, azelaic, sebasic, maleic, fumaric, itaconic, citraconic and the like. The term "acid" as used herein and in the claims shall include the acid anhydrides where they exist. Characteristically, the final reaction product is that of a polycarboxylic acid which contains at least one unesterified carboxyl group with a compound containing more than one epoxy group. This partial ester of a polycarboxylic acid with the epoxy compound is used in an amount from about 0.31 to 0.53 percent by weight based on the total weight of the sizing composition.

The coupling agent system which is used to promote bonding between the resin matrices and the glass fibers is a dual silane coupling agent system. Typically, the silane coupling agents have one portion of the molecule composed of a highly hydrolizable group such as

wherein R is an alkyl group having 1 to 5 carbon atoms, preferably one to two carbon atoms. The other portion of the silane molecule has a reactive group thereon which is amino or acrylic. The amino silane and the acrylic silane are both used in the sizing composition of the invention each in a range of 0.14 to 0.44 percent by weight based on the total weight of the size with a range of total silane concentrations of 0.35 to 0.55 percent by weight. Typical amino silane coupling agents are, but not limited to, gamma-amino propyltriethoxy silane, gamma-amino propyl trimethoxy silane, N-beta(aminoethyl)-gamma aminopropyltrimethoxysilane and other aminoalkyltrialkoxysilanes. The unsaturated silanes used in the practice of the invention are the methacryloxyalkyl trialkoxy silanes and particularly gamma-methacryloxypropyltrimethoxysilane.

Prior to incorporation of the methacrylate coupling agent into the sizing composition, the methoxy groups are hydrolyzed. The hydrolysis is accomplished by mixing acetic acid, water and the silane and stirring for a sufficient time and temperature to hydrolize the

group to form methanol and the silanol

Non-ionic surface active agents are added to the sizing composition to impart wettability of the size to the glass and to render the water immiscible portion of the sizing composition emulsifiable. The non-ionic surface active agents acting as emulsifiers are polyalkylene glycols formed of mixed alkylene oxides, alkylphenoxyalkyleneoxyalkanols and polyoxyalkylated vegetable oils. A particularly useful polyalkylene glycol emulsifier is an ethylene oxide-propylene glycol reaction product having a hydroxyl number of 6 to 10 and a melting point of 55° to 57° C. sold as FC-180 manufactured by Whitestone Chemical Co. The alkylphenoxypolyalkyleneoxyalkanol which has found utility in this practice of the invention is octylphenoxypolyethylenoxyethanol sold by Rohm and Haas Co. as IGEPAL CA 630. A polyoxyalkylated vegetable oil which aids in the emulsification of the water immiscible constituents of the size is polyoxyethylated vegetable oil sold by GAF Corporation under the name of EMULPHOR EL-719. The emulsifier and wetting agent concentration should range between 0.58 and 1.0 percent based on the total weight of the size.

Other known glass fiber sizing ingredients may be added to the composition of the invention including cationic lubricants, non-ionic lubricants, protective colloids, plasticizers, anti-foaming agents and the like.

The cationic lubricant is typically the amine salt of a fatty acid. It is preferable that the fatty acid moiety of the salt has between about 12 and 22 carbon atoms. The amines useful for forming the salt are tertiary amines of substantially low molecular weight, i.e., the alkyl groups attached to the nitrogen atom should have between 1 and 6 carbon atoms. This cationic lubricant aids in the processing of the glass fiber strand and the roving formed therefrom by imparting slip to the exterior of the strand or roving as it passes over various types of processing equipment. The cationic lubricant is used at a level of about 0.05 to 0.09 percent by weight based on the total weight of the size.

The plasticizers, typically polyethylene glycols with a relatively low molecular weight may be incorporated into the sizing composition at a level of up to about 0.64 percent by weight based on the total weight of the size. Particularly useful plasticizers have been found to be polyethylene glycols having an average molecular weight of about 300 sold by Union Carbide Corporation as CARBOWAX 300.

The protective colloides which may be utilized in the size of the invention enhance in stabilizing the homogeniety of the sizing composition. A typical protective colloid is polyvinylpyrrolidone used at a level of up to 1.6 percent based on the total weight of the size. At the levels between about 0.3 to 1.6 the polyvinyl pyrrolidone imparts film forming properties to the size.

The invention will be further elucidated by the following examples.

DESCRIPTION OF PREFERRED EMBODIMENT

EXAMPLE I

A sizing composition is prepared having the following composition:

| Ingredients | Percent by Weight Based on the Total Weight of the Size | Percent by Weight Based on the Total Solids of the Sizing Composition |
|---|---|---|
| Epoxy resin | 1.9 to 3.2 | 38.0 to 64.0 |

-continued

| Ingredients | Percent by Weight Based on the Total Weight of the Size | Percent by Weight Based on the Total Solids of the Sizing Composition |
| --- | --- | --- |
| Reaction product of the partial ester of a polycarboxylic acid containing one or more unesterified carboxyl groups with a compound containing more than one epoxy group | .31 to .53 | 6.2 to 10.6 |
| Oxyalkylene glycol emulsifier | .23 to .39 | 4.6 to 7.8 |
| Oxyalkylated vegetable oil emulsifier | .23 to .39 | 4.6 to 7.8 |
| Alkylphenoxypolyalkylene oxyalkanol emulsifier | .12 to .22 | 2.4 to 4.4 |
| Protective colloid | up to 1.6 | up to 32 |
| Plasticizer | up to .64 | up to 12.8 |
| Methacryloxyalkyltrialkoxysilane | .14 to .44 | 2.8 to 8.8 |
| Amino silane coupling agent | .14 to .44 | 2.8 to 8.8 |
| Cationic lubricant | .05 to .09 | 1.0 to 1.8 |

The remainder of the sizing composition is water.

The remainder of the sizing composition is water.

The desired pH range for the size is between 5.5 and 7.5 with an optimum solids concentration of 4.0 to 6.0 percent. After sizing, the glass fiber strand has on the surface thereof approximately 0.3 to 0.7 percent of the sizing solids based on the weight of the size solids and the glass.

In preparing the sizing composition, the epoxy resin and the surface active agents are charged to an Eppenbach emulsification tank. These ingredients are heated with agitation to 38° C. (100° F.). Hot water, 60° to 71° C. (140° to 160° F.) is added to the Eppenbach slowly. When an oil emulsion is formed, the water is continued to be added until about one half of the total water to be added is incorporated into the emulsion. This emulsion is pumped to a main mix tank. The reaction product of the partial ester of the polycarboxylic acid containing one or more unesterified carboxyl groups with a compound containing more than one epoxy group is diluted to produce an admixture of about 50 percent solids in approximately 38° C. (100° F.) water and added to the main mix tank. When the partial ester reaction product is not water dispensible or soluble it may be combined with the epoxy resin and emulsified therewith. The protective colloid is also diluted to about 50 percent solids in, 60° to 71° C. (140° to 160° F.) water and then added to the main mix tank. The methacryloxyalkyltrialkyoxysilane is added to an acetic acid-water solution and hydrolyzed producing a silane concentration of 5 percent solids or less. The solution is then added to the main mix tank. The amino silane coupling agent is added to an acetic acid-water solution to form a 5 percent solids aqueous solution and then added to the main mix tank. The cationic lubricant is diluted to about 50 percent solids in 60° to 71° C. (140° to 160° F.) and added to the main mix tank. If a plasticizer is to be incorporated into a sizing composition, it is to be admixed with 38° C. (100° F.) water and added prior to the protective colloid. If the plasticizer is not water dispersible or soluble it may be combined with the epoxy resin and emulsified therewith.

After the sizing has been formed as above, it is pumped in recirculating fashion to a binder applicator which applies the size to the filaments during formation. The fibers are formed in the conventional manner by applying the size by a belt type applicator, gathering the individual filaments into strand, and collecting the strand on a forming tube which is mounted on a winder. The forming package is removed from the winder and dried in a forced air oven or a dielectric oven until substantially all of the water is removed therefrom. Subsequent to drying the sized fiber can be unwound and used directly for reinforcement, fabricated into chopped strand mat, formed into roving or the like.

EXAMPLES II THROUGH IV

Sizing compositions were prepared having the following formulations:

TABLE II

| Ingredient | Example II Grams/liter (wt. %) | Example III Grams/liter (wt. %) | Example IV Grams/liter (wt. %) |
| --- | --- | --- | --- |
| EPON* 828 (reaction product of bisphenol A and epichlorohydrin epoxy equivalent 185-195) | 19.19 (1.92) | 21.12 (2.11) | 25.34 (2.54) |
| Reaction product of partial ester of maleic anhydride and monomethyl ether of polyethylene glycol reacted with 3,4 epoxy-cyclohexane carboxylate | 3.19 ( .32) | 3.51 ( .35) | 4.22 (.42) |
| Industriol* FC-180 ethylene oxyalkylated propylene glycol Hydroxyl No. 6-10 | 2.38 ( .24) | 2.59 ( .26) | 3.11 ( .31) |
| Emulphor* 719 poxyethylene oxyalkylated vegetable | 2.38 ( .24) | 2.59 ( .26) | 3.11 ( .31) |

TABLE II-continued

| Ingredient | Example II Grams/liter (wt. %) | Example III Grams/liter (wt. %) | Example IV Grams/liter (wt. %) |
|---|---|---|---|
| oil | | | |
| Igepal* CA-630 octylphenoxy polyethylenoxythanol | 1.32 ( .13) | 1.45 ( .15) | 1.74 ( .17) |
| Carbowax* 300 (polyethylene glycol 300MW) | — | — | 5.07 ( .51) |
| α-methacrytoxypropyltri- ethoxysilane | 1.08 (0.11) | 2.40 (.241) | 2.88 ( .29) |
| α-aminopropyltriethoxy- silane | 3.27 (0.33) | 2.40 (.241) | 2.88 ( .29) |
| Emery 6717 (Fatty acid amide lubricant) | .55 ( .06) | 0.61 (0.06) | 0.71 ( .07) |
| Polyvinylpyrrolidone | 9.61 (0.96) | 10.56 (1.06) | — |

Sufficient water to make 1 liter of size. The sizes of Examples II through IV were prepared in accordance with the procedure of Example I.

Glass fibers were sized in accordance with the procedure of Example I and used to reinforce various resin matrices. The physical properties of the reinforced articles were as follows:

Physical Properties of Composites

| | Resin Matrix | | | | | Vinyl Ester Resin DERAKANE | |
|---|---|---|---|---|---|---|---|
| | Styrene/Polyester | | Thermosetting Epoxy Resin | | | | |
| Physical Property | II | III | II | III | IV | II | III |
| Ring Tensile Strength Pascals (PSI) × 10³ | 1585 (230) | 1482 (215) | 1241 (180) | 1406 (204) | 1331 (193) | 1434 (208) | 1551 (225) |
| Ring Tensile Strength Retention After 2 hours in boiling water | 97% | 107% | 86% | 88% | 89% | 91% | 102% |
| Filament Tensile Reinforcement strength pascals (PSI) × 10³ | 2434 (353) | 2206 (320) | 2047 (297) | 2158 (313) | 2165 (314) | 2089 (303) | 2206 (320) |
| Filament Tensile Reinforcement strength retention after 2 hours in boiling water | 97% | 106% | 95% | 96% | 89% | 91% | 102% |
| Horizontal Shear pascals (PSI) × 10³ | 46 (6.7) | 65 (9.5) | 79 (11.4) | 80 (11.6) | 85 (12.3) | 40 (5.8) | 54 (7.9) |
| Horizontal Shear Retention after 6 hours in boiling water | 79% | 94% | 100% | 97% | 95% | 99% | 100% |

As is demonstrated by the above table, the sizing composition of the instant invention is useful in sizing glass fibers for the reinforcement for a variety of resin matrices, particularly, polyester, epoxy and vinyl ester resins.

Although the invention has been exemplified by specific embodiments with specific ingredients and percentages thereof, the invention is not to be limited only as is set forth in the accompanying claims.

I claim:

1. An aqueous glass fiber sizing composition suitable for sizing glass fibers for use as reinforcement for resin matrices including polyester, epoxy and vinyl ester resins comprising in percent by weight
   1.9 to 3.2 of a phenolic epoxy resin,
   0.31 to 0.53 of the reaction product of a partial ester of a polycarboxylic acid containing one or more unesterified carboxyl groups with a compound containing more than one epoxy group,
   0.58 to 1.0 of non-ionic surface active agents,
   a coupling system including
   0.14 to 0.44 of an amino silane coupling agent and
   0.14 to 0.44 of a methacryloxyalkyltrialkoxy silane, and
   the balance of said sizing composition being water.

2. The glass fiber sizing composition of claim 1 wherein said epoxy resin has a molecular weight of less than 400.

3. The glass fiber sizing composition of claim 1 wherein said reaction product of the partial ester of the polycarboxylic acid containing one or more unesterified carboxyl groups with the compound containing more than one epoxy group is the reaction product of maleic anhydride and the mono-methyl ether of polyoxyethylene glycol, said glycol having a molecular weight of 750 further reacted with 3,4 epoxy cyclohexyl methyl 3,4 epoxy cyclohexane carboxylate.

4. The sizing composition of claim 1 wherein said amino silane coupling agent is gamma-aminopropyltriethoxysilane.

5. The sizing composition of claim 1 wherein said methacrylate silane is methacryloxypropyl trimethoxy silane.

6. The sizing composition of claim 1 having up to 0.64 percent by weight of polyoxyethylene glycol having a molecular weight of 250 to 600.

7. The sizing composition of claim 1 having up to 1.6 percent by weight of polyvinyl pyrrolidone.

8. The sizing composition of claim 1 having up to 0.1 percent by weight of a fatty acid amide lubricant.

9. In the method of forming glass fiber strand comprising drawing glass filaments from molten cones of glass in a bushing, applying aqueous sizing composition to said filaments during formation, gathering the filaments into strand, and collecting the strand, the improvement comprising sizing the said filaments with an aqueous composition which renders the glass strand produced from said filaments suitable for reinforcing resin matrices including polyester, epoxy and vinyl ester resins and whose solids comprise in percent by weight 1.9 to 3.2 of a phenolic epoxy resin,
0.31 to 0.53 of the reaction product of the partial ester of a polycarboxylic acid containing one or more unesterified carboxyl groups with a compound containing more than one epoxy group,
0.58 to 1.0 of non-ionic surface active agents,
a coupling agent system including
0.14 to 0.44 of an amino silane coupling agent,
0.14 to 0.44 of a methacryloxyalkyltrialkoxy silane, and
the balance of said sizing composition being water.

10. The method of claim 9 wherein said epoxy resin has a molecular weight of less than 400.

11. The method of claim 9 wherein the reaction product of the partial ester of the polycarboxylic acid containing one or more unesterified carboxyl groups with the compound containing more than one epoxy group is the reaction product of maleic anhydride and the monomethyl ether of polyoxyethylene glycol said glycol having a molecular weight of 750, further reacted with 3,4 epoxy cyclohexyl methyl 3,4 epoxy cyclohexane carboxylate.

12. The method of claim 9 wherein said amino silane coupling agent is gamma aminopropyltriethoxy silane.

13. The method of claim 9 wherein the methacrylate silane is methacryloxy propyltrimethoxy silane.

14. The sizing composition of claim 9 having up to 0.64 percent by weight of polyoxyethylene glycol having a molecular weight of 250 to 600.

15. The sizing composition of claim 9 having up to 1.6 percent by weight of polyvinyl pyrrolidone.

16. The sizing composition of claim 9 having up to 0.1 percent of a fatty acid amide lubricant.

17. Glass fibers produced by the method of claim 9.

* * * * *